E. C. WOOD.
EMULSIFIER.
APPLICATION FILED APR. 3, 1911.
1,003,848.
Patented Sept. 19, 1911.
4 SHEETS—SHEET 3.
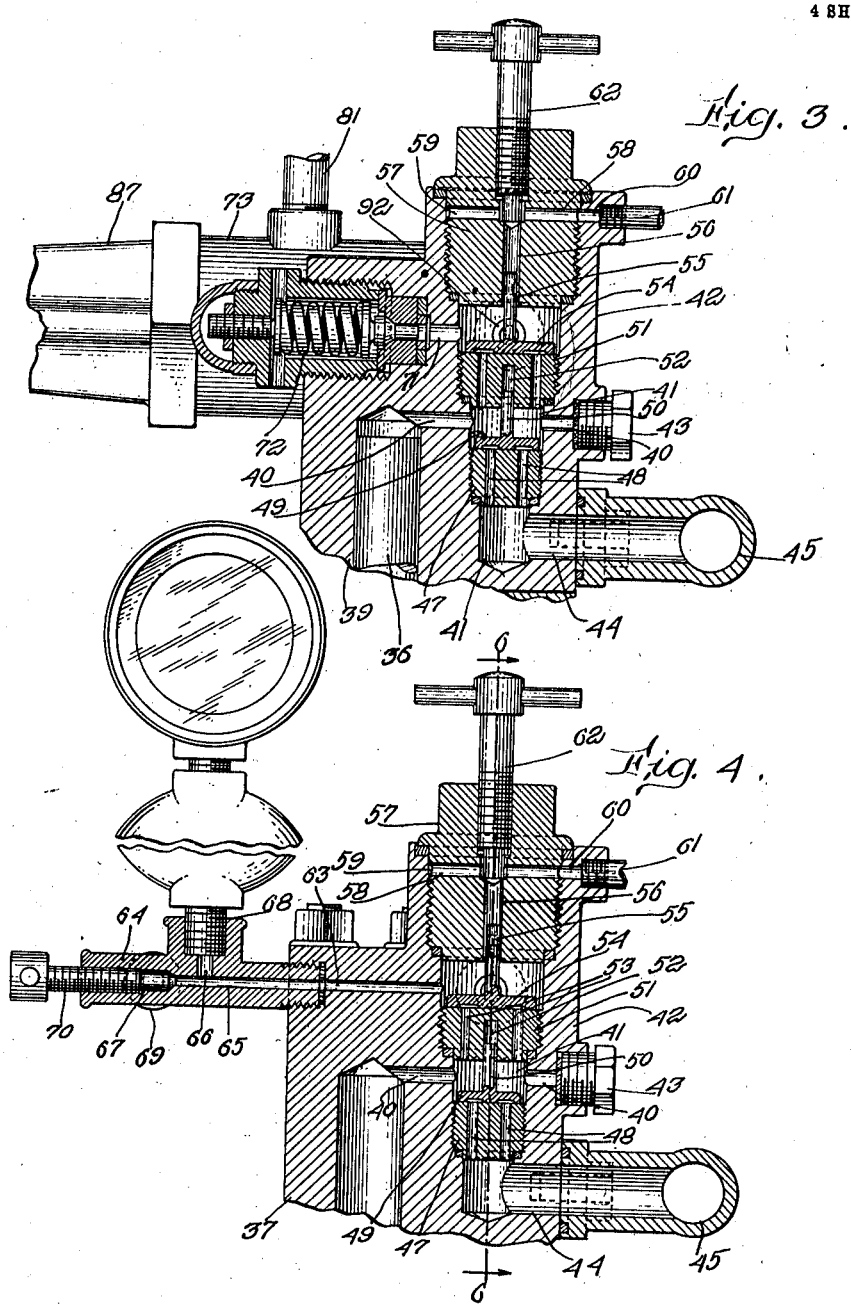
Witnesses:
Lucius B. Weymouth.
H. E. Morton.
Inventor:
Edward C. Wood
by Henry J. Miller
atty.

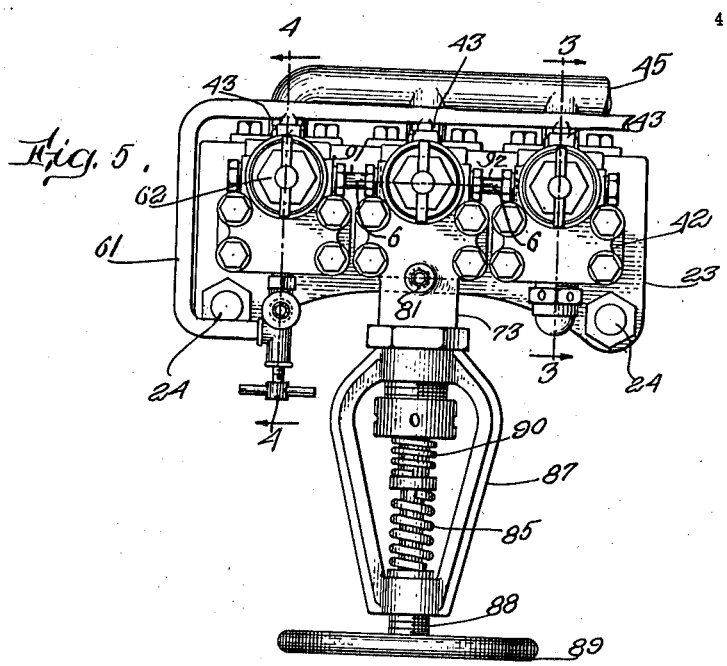
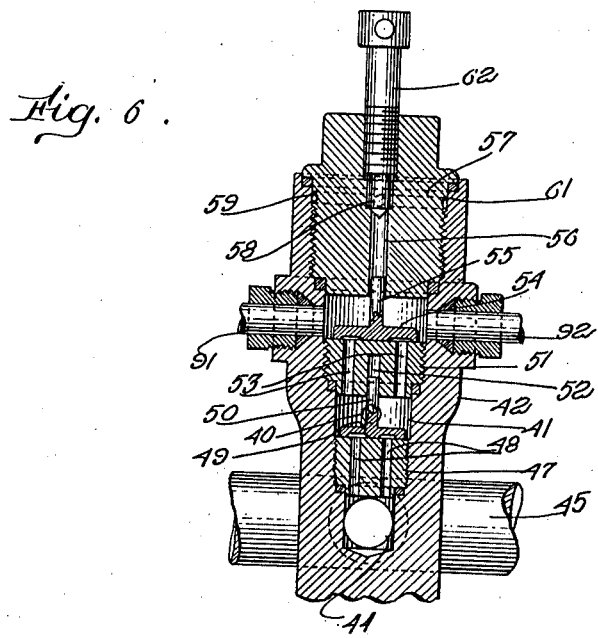

UNITED STATES PATENT OFFICE.

EDWARD C. WOOD, OF SOMERVILLE, MASSACHUSETTS, ASSIGNOR TO MANTON-GAULIN MANUFACTURING COMPANY, A CORPORATION OF MASSACHUSETTS.

EMULSIFIER.

1,003,848.      Specification of Letters Patent.      Patented Sept. 19, 1911.

Application filed April 3, 1911. Serial No. 618,534.

*To all whom it may concern:*

Be it known that I, EDWARD C. WOOD, of Somerville, in the county of Middlesex and State of Massachusetts, have invented certain new and useful Improvements in Emulsifiers, of which the following is a specification, reference being had to the accompanying drawings, forming part thereof.

This invention has reference to improvements in machines for treating milk and other liquids under pressure whereby the constituents of milk or other fluid are intimately mixed to homogenize or emulsify the same.

The principal object of this invention is to improve the construction of machines of this nature whereby the process of intimately mixing the constituents of the milk or other liquid may be carried out expeditiously and economically.

Other objects of the invention will appear from the following description.

The invention consists in certain peculiar features of construction and combination of parts as shall hereinafter be more fully described and pointed out in the claims.

Figure 1:
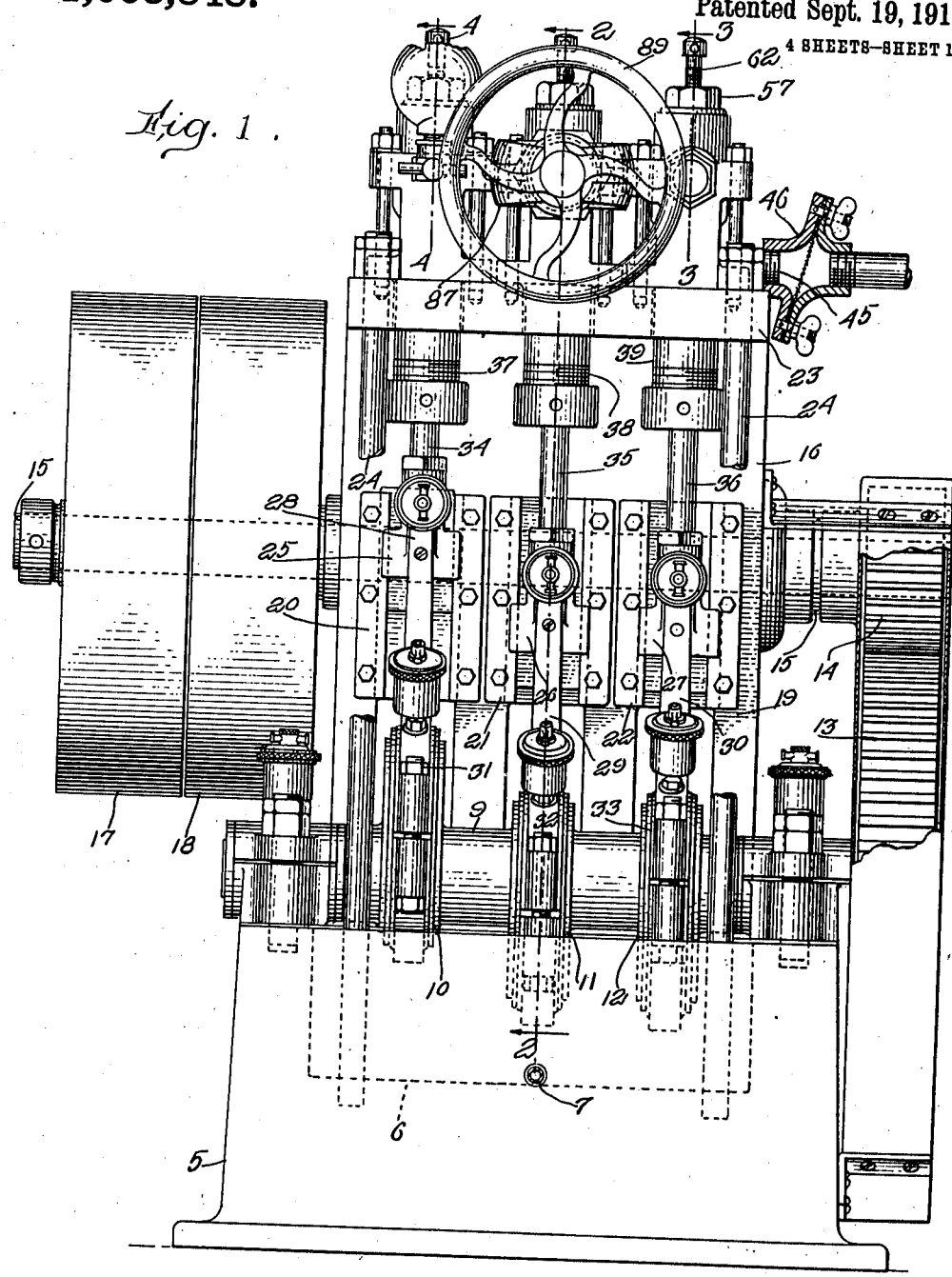
Figure 2:
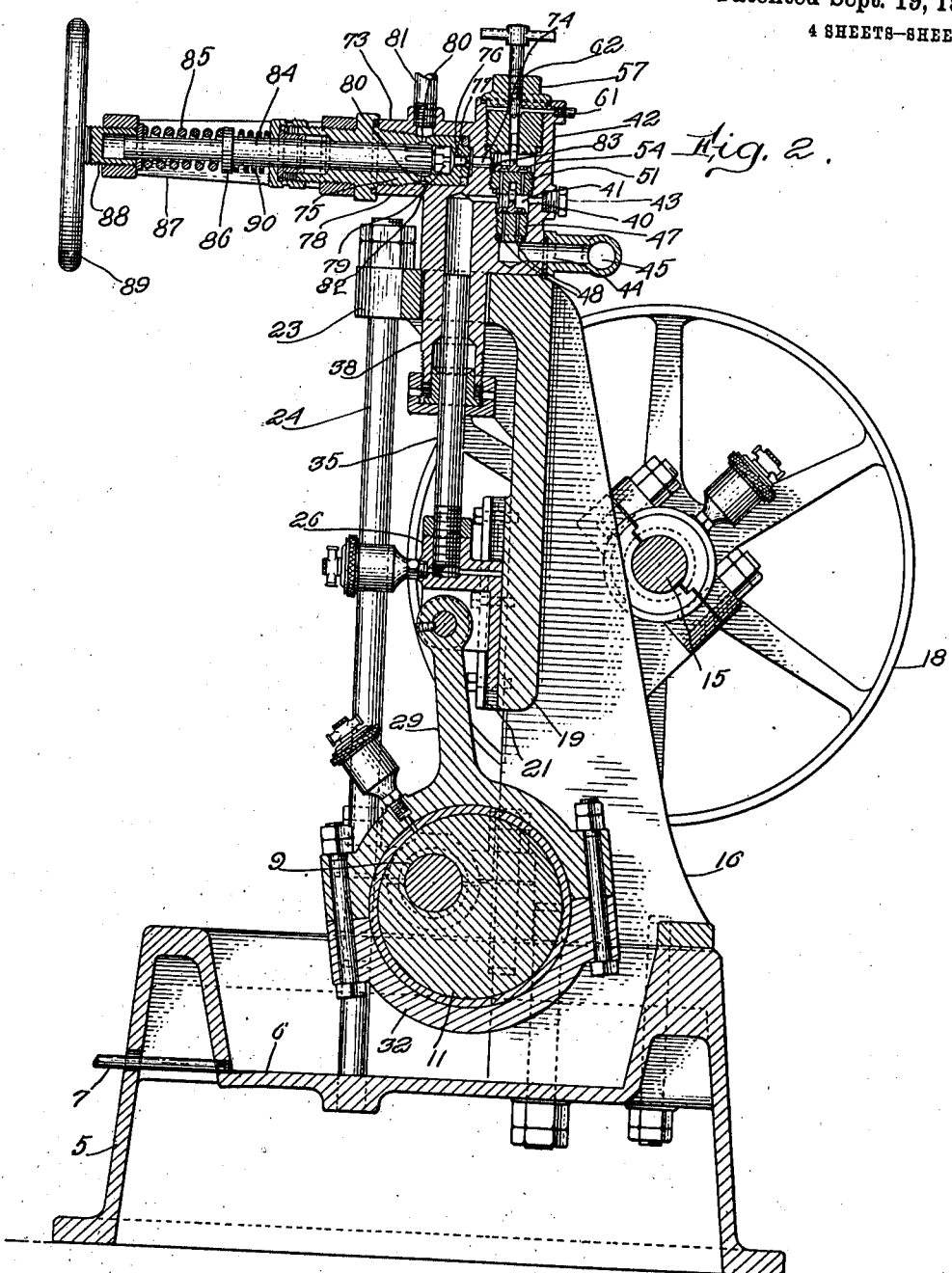

Figure 1, represents the improved machine in front elevation, parts of the same being broken away. Fig. 2, represents a vertical sectional view taken on line 2—2 Fig. 1, looking in the direction indicated by the arrows. Fig. 3, represents an enlarged view, in vertical section, taken on lines 3—3 Figs. 1 and 5, looking in the direction indicated by the arrows. Fig. 4, represents a similar view taken on lines 4—4 Figs. 1 and 5. Fig. 5, represents a plan view of the head of the machine. Fig. 6, represents a vertical sectional view taken on line 6—6 Fig. 4, looking in the direction indicated by the arrows, showing the construction of the valve chambers and the equalizing pipe connections between the several valve chambers.

Similar numbers of reference designate corresponding parts throughout.

As shown in the drawings 5, represents a suitable base having the depression or drip receptacle 6 in its upper portion furnished with the outlet pipe 7 through which the milk or other liquid, that may drip from the upper portion of the machine, may be conveyed. This base 5 has also the bearings 8, 8 in which is journaled the cam shaft 9, having the eccentric cams 10, 11 and 12, and the large gear 13, Fig. 1, which is driven from the small gear 14, of the main shaft 15, journaled in bearings in the frame 16 mounted on the base 5, and having the pulleys 17 and 18.

Frame 16 is securely fastened to the base 5, and has the vertical member 19, furnished with the guides 20, 21 and 22, and the upper horizontal member 23, furnished with the bolts 24, 24 the lower ends of which are secured in the base 5. In the guides 20, 21 and 22, are slidably mounted the blocks 25, 26 and 27, to which motion is imparted by the rods 28, 29 and 30, of the frames or straps 31, 32 and 33 embracing, respectively, the eccentric cams 10, 11 and 12, which latter are so related, as to their throw, that said blocks 25, 26 and 27 are operated in succession whereby the pistons 34, 35 and 36, fixed to said blocks 25, 26 and 27 are similarly operated in the bores of their respective pump cylinders 37, 38 and 39, which extend through openings in the frame member 23, and are secured to said member by bolts.

The pump cylinders 37, 38, 39, are practically similar in construction as regards the channels for conveying liquid to and from the bores of said cylinders and the valves which control the flow of liquid to and from said bores; the general construction of said supply channels and their valves, and the connections between said channels will therefore be first described and the more important attachments or modifications appertaining to the respective pump cylinders will then be pointed out.

Communicating with the upper end of each of the vertical bores of the pump cylinders 37, 38 and 39, is the horizontal channel 40 which intersects the vertical valve chamber 41 and extends to the face of the casting 42 at which end it is closed by the plug 43. At their lower ends the valve chambers 41 have branch channels 44 which communicate, at the face of the casting 42, with the respective branches of the general supply pipe 45 to which the liquid to be treated is delivered from any source but preferably through the strainer chamber 46, Fig. 1. In the valve chamber 41 are secured the valve seats 47 and 51 spaced apart, of which valve seat 47, has the perforations 48, 48 and is furnished with the aspiration valve 49 free to move away from its seat 47 and having the stem 50 movably received in the bore 52 of the valve seat 51 which seat has the perforations 53, 53 and is supplied with the valve 54 having the stem 55 which is free to move in the bore 56 of the screw plug 57 by which the upper end of the valve chamber is closed. In order to supply an exit for air, which is drawn into the machine under operation, the bore 56 of said plug 57 extends through the plug 57 and intersects the transverse channel 58 which communicates with the annular channel 59 of said plug 57 which is in line with the channel 60, of the casting 42, from which the air, and fluid escaping with the air, is conveyed by the pipe 61 to some suitable receptacle which forms no part of the present invention. Ordinarily the bore 56 is closed by the screw valve 62 having a conical end which is seated in the bore 56 below the channel 58.

Communicating with the upper portion of the valve chamber 41 of the cylinder 37 is the channel 63 with which is connected the fitting 64 having the axial passage 65 and the branch channels 66 and 67 the former of which is connected by the pipe 68 with any suitable pressure gage while the latter, indicated in Fig. 4, connects with the air outlet 61, 61 of all the valve chambers. The closing of the passage 65 from the channel 67 is effected by the screw valve 70 having an end adapted to be seated against a shoulder formed in the wall of passage 67.

Valve chamber 41 of the cylinder 39 has at its upper portion the channel 71 which communicates with a pressure relief valve of any suitable construction and indicated in the drawings as a whole by numeral 72.

The casting of which cylinder 38 forms part has at its upper end the laterally extending chamber 73 which is connected by the passage or duct 74 with the upper portion of the valve chamber 41 of said cylinder 38. In said chamber 73 is mounted the plug 75 having a bore furnished at its inner end with the conical seat 76 and with the restricted channel 77, communicating with the passage 74, and the internal and external circumferential grooves 78 and 79 connected by the ducts 80, 80, and located approximately in line with the branch outlet of the chamber 73 to which the delivery pipe 81 is connected. In the bore of plug 75 is mounted the block or valve 82 which is preferably formed of agate or other hard material and has an end shaped to conform to the seat 76 and the stem 83 extending into the passage 74. Pressure is applied, to press said block or valve 82 against its seat 76, by means of the plunger 84 which is slidable in the bore of plug 75 and is pressed inward by the spring 85 bearing against the enlargement 86 of said plunger 84 and against the frame 87 which is securely mounted on the chamber 73. This frame 87 has in its end a screw threaded bore in which the threaded spindle 88 of the hand wheel 89 is engaged so that, by the rotation of said hand wheel and said screw engagement of spindle 88 said spindle may be brought to exert a positive pressure on the plunger 84. Between the enlargement 86 of said plunger 84 and some fixed part of the machine is located the cushioning spring 90.

The upper portion of the valve chambers 41, 41 of the cylinders 37 and 38, 39 and 38 are connected respectively by the pipes 91 and 92 so that liquid may pass from the valve chambers of both of the cylinders 37 and 39 to the upper part of the valve chamber 41 of the cylinder 38 which therefore forms a central receptacle for liquid to which pressure may be applied by the upward movement of any one of the pistons 34, 35 or 36 either directly, by piston 35, or indirectly by pistons 34 or 36 acting on the milk or other liquid in their cylinders.

In the downward movement of the several pistons 34, 35 and 36 milk or other liquid is drawn from the supply pipe 45, through the branches thereof, and enters the lower ends of the respective valve chambers 41 then passing through the channels 48 of the valve chambers, lifting the valves 49, and through the channels 40 into the bores of the respective cylinders 37, 38 and 39. On the upward movement of the pistons 34, 35 and 36 the milk or other liquid is forced from the bores of said cylinders 37, 38 and 39 back through the channels 40 and, with the contents of the valve chambers 41 above the valves 49, passes through the channels 53 of the valve seats 51 to the upper ends of said valve chambers 41. From the valve chambers 41 of the cylinders 37 and 39 the milk or liquid passes through the pipes 91 and 92 to the upper portion of the corresponding valve chamber 41 of the cylinder 38.

Under the pressure exerted on the milk or other liquid in the upper portion of said valve chamber 41 of cylinder 38, by or through the operation of the pistons 34, 35 and 36, said milk or liquid is forced through the channel 74, Fig. 2, and into the channel 77 of plug 75 where the stream of milk or liquid passes as a thin annular sheet between the stem 83 of the mixing block 82 and the wall of said channel 77 and then between the conical seat 76, of said plug 75, and the complemental face of the block 82 where the milk or liquid is subjected to great pressure and the globular or fat carrying particles thereof are disrupted and their constituents are intimately mixed with the liquid in which they are carried whereby a homogeneous liquid is formed.

After passing between the block 82 and its seat the milk or liquid enters the inner circumferential groove 78 of the plug 75 and thence through the ducts 80 to the outer circumferential groove 79 to the delivery pipe 81 by which the product is conveyed to any suitable point.

I am aware of Letters Patent to August Gaulin, No. 756,953, dated April 12, 1904, and it is not my intention to claim herein anything shown or claimed in said patent.

Having thus described my invention I claim as new and desire to secure by Letters Patent.

1. An emulsifier of the nature described comprising a base having receptacle open at its top, a vertical frame mounted on said base, a series of vertical cylinders carried by said frame and having valve chambers communicating one with another, inlet and outlet valves in said valve chambers, and an emulsifier connected with one of said valve chambers, substantially as described.

2. An emulsifier of the nature described comprising a base having a receptacle open at its top, a vertical frame mounted on said base, a series of pressure pumps having vertical cylinders mounted on said base, and a laterally extending emulsifier carried by said frame and in communication with said pump cylinders, substantially as described.

3. An emulsifier of the nature described comprising a base, a vertical frame mounted on said base, and having a series of vertical guides, blocks slidable in said guides and having pistons, means for operating said slide blocks in succession, a series of vertical pump cylinders mounted on said frame and having bores in which said pistons operate, a series of vertical valve chambers communicating with said cylinder bores and with each other, inlet and outlet valves in each of said valve chambers, and an emulsifier connected with one of said valve chambers, substantially as described.

4. An emulsifier of the nature described comprising a base having bearings, a shaft journaled in said base and having a series of cams and a gear, a vertical frame mounted on said base and having a series of vertical guides, a drive shaft journaled in bearings of said frame having a gear in mesh with the gear of the cam shaft, a series of pump cylinders carried by said frame, pistons in said cylinders, blocks slidable in said guides on which said pistons are mounted, means for operating said blocks from said cams, and an emulsifier connected with one of said cylinders, substantially as described.

5. An emulsifier of the nature described comprising a series of pump cylinders, a series of pistons operating in said cylinders, means for driving said pistons, a series of valve chambers parallel to said cylinders and communicating therewith, inlet and outlet valves in said valve chambers, pipes connecting said valve chambers, and an emulsifier chamber extending from one of said valve chambers, substantially as described.

6. An emulsifier of the nature described comprising a vertical frame having a lateral member, and a unitary pump cylinder, valve chamber and emulsifier chamber mounted on said member, said pump cylinder and valve chamber being parallel, and having a connecting channel, said mixing chamber extending laterally from the valve chamber above the pump cylinder, substantially as described.

7. An emulsifier of the class described comprising a frame and a unitary pump cylinder, valve chamber and emulsifier chamber mounted on said frame, said pump cylinder and valve chamber being parallel and having a connecting channel, said valve chamber having inlet and outlet valves, and said emulsifier chamber extending transversely of said pump cylinder and having a channel communicating with the valve chamber.

8. An emulsifier of the nature described comprising a unitary pump cylinder valve chamber, and emulsifier chamber, said pump cylinder and valve chamber being parallel and having overlapping ends, a channel extending from the outer wall of the valve chamber to the pump cylinder and intersecting said valve chamber, one end of said valve chamber having a removable plug furnished with an air escape channel and a closure therefor.

9. An emulsifier of the nature described, comprising a unitary pump cylinder, valve chamber and emulsifier chamber in communication, the valve chamber extending parallel with the pump cylinder, and valves for preventing the backward flow of liquid, the mixing chamber extending laterally from the valve chamber above the pump cylinder, a plug mounted in said emulsifier chamber and having an axial channel and a valve seat embracing said channel, a valve located against said seat and pressure exerting means tending to hold said valve in position substantially as described.

10. An emulsifier of the nature described comprising a series of independent pump cylinders having valve chambers connected together one of said valve chambers being furnished with a pressure relief valve and another of said valve chambers being connected with an emulsifier chamber substantially as described.

EDWARD C. WOOD.

Witnesses:
N. J. MILLER,
H. E. MORTON.